United States Patent
Harper et al.

(10) Patent No.: US 9,116,980 B1
(45) Date of Patent: Aug. 25, 2015

(54) SYSTEM, METHOD, AND COMPUTER PROGRAM FOR DETERMINING A SET OF CATEGORIES BASED ON TEXTUAL INPUT

(71) Applicant: Amdocs Software Systems Limited, Dublin (IE)

(72) Inventors: Andrew Harper, Roswell, GA (US); Ilya A. Harahap, San Jose, CA (US)

(73) Assignee: Amdocs Software Systems Limited, Dublin (IE)

( * ) Notice: Subject to any disclaimer, the term of this patent is extended or adjusted under 35 U.S.C. 154(b) by 262 days.

(21) Appl. No.: 13/752,279

(22) Filed: Jan. 28, 2013

(51) Int. Cl.
G06F 17/21 (2006.01)
G06F 17/27 (2006.01)
H04M 3/51 (2006.01)
G06F 17/30 (2006.01)

(52) U.S. Cl.
CPC .............................. *G06F 17/30705* (2013.01)

(58) Field of Classification Search
CPC ... G06F 17/21; G06F 17/27; G06F 17/30705; H04M 3/51
USPC ............. 704/1, 9, 235, 251, 275; 379/265.06, 379/265.07
See application file for complete search history.

(56) References Cited

U.S. PATENT DOCUMENTS

| | | | |
|---|---|---|---|
| 5,371,807 A * | 12/1994 | Register et al. | 704/9 |
| 6,618,715 B1 * | 9/2003 | Johnson et al. | 706/47 |
| 7,409,336 B2 * | 8/2008 | Pak et al. | 704/10 |
| 7,752,159 B2 * | 7/2010 | Nelken et al. | 704/9 |
| 8,000,956 B2 | 8/2011 | Brun et al. | |
| 8,145,482 B2 * | 3/2012 | Daya et al. | 704/251 |
| 8,364,467 B1 * | 1/2013 | Bowman et al. | 704/9 |
| 8,385,532 B1 * | 2/2013 | Geist et al. | 379/265.03 |
| 8,676,586 B2 * | 3/2014 | Wasserblat et al. | 704/270 |
| 2002/0184505 A1 | 12/2002 | Mihcak et al. | |
| 2005/0149382 A1 * | 7/2005 | Fenner et al. | 705/10 |
| 2008/0201133 A1 | 8/2008 | Cave et al. | |
| 2010/0161373 A1 * | 6/2010 | Connors et al. | 705/9 |
| 2011/0007889 A1 * | 1/2011 | Geffen et al. | 379/265.06 |
| 2011/0206198 A1 * | 8/2011 | Freedman et al. | 379/265.03 |
| 2012/0215535 A1 * | 8/2012 | Wasserblat et al. | 704/243 |
| 2015/0026087 A1 * | 1/2015 | D'Amore et al. | 705/321 |

FOREIGN PATENT DOCUMENTS

WO 2004110030 A2 12/2004

* cited by examiner

*Primary Examiner* — Martin Lerner
(74) *Attorney, Agent, or Firm* — Zilka-Kotab, PC

(57) ABSTRACT

A system, method, and computer program product are provided for determining a set of categories based on textual input. In use, textual input is identified. Further, a first set of categories is determined based on the textual input. Further still, one or more actions are performed, utilizing the first set of categories.

8 Claims, 4 Drawing Sheets

US 9,116,980 B1

SYSTEM, METHOD, AND COMPUTER PROGRAM FOR DETERMINING A SET OF CATEGORIES BASED ON TEXTUAL INPUT

FIELD OF THE INVENTION

The present invention relates to textual analysis, and more particularly to textual categorization.

BACKGROUND

Quickly and accurately categorizing received data is an important part of many current business practices. For example, customer service representatives may need to categorize received customer data in an expedited and efficient manner. Unfortunately, conventional methods for categorizing received data have exhibited various limitations.

For example, current technology may not be able to efficiently confirm the correctness of one or more categorizations provided by a human user. There is thus a need for addressing these and/or other issues associated with the prior art.

SUMMARY

A system, method, and computer program product are provided for determining a set of categories based on textual input. In use, textual input is identified. Further, a first set of categories is determined based on the textual input. Further still, one or more actions are performed, utilizing the first set of categories.

DETAILED DESCRIPTION

Figure 1:
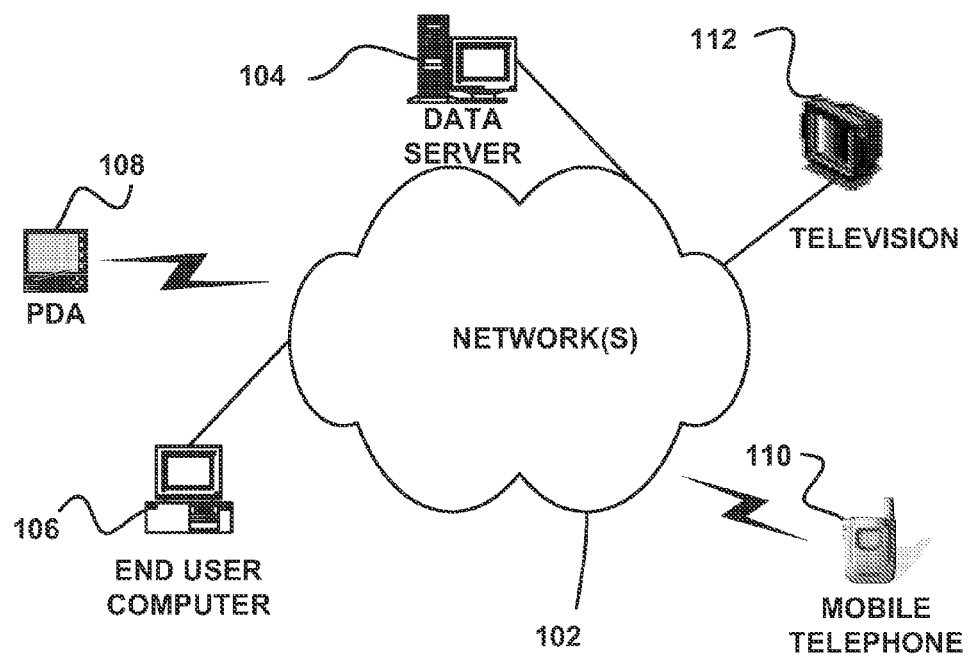
FIG. 1 illustrates a network architecture, in accordance with one possible embodiment.
Figure 1:

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
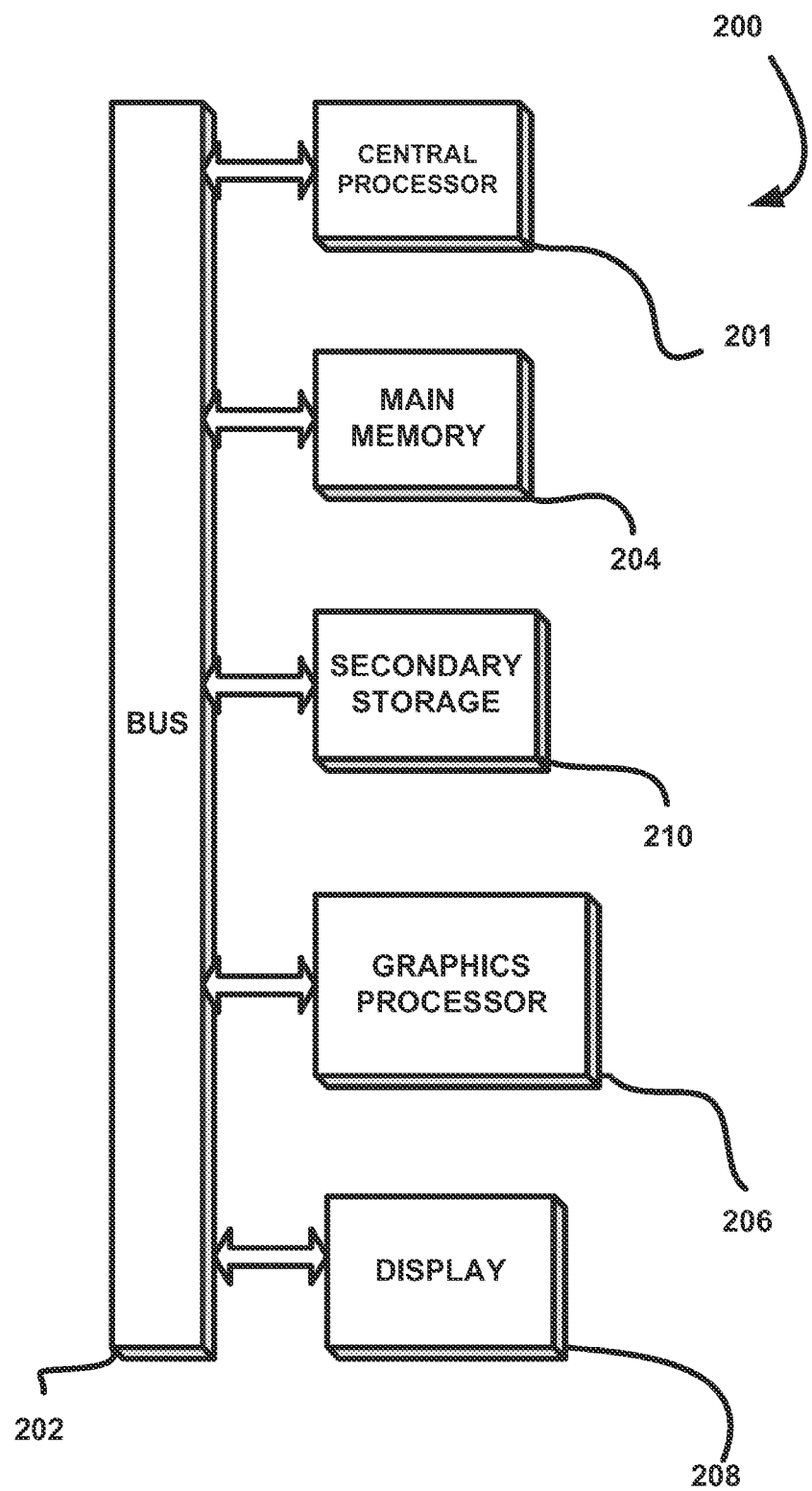
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
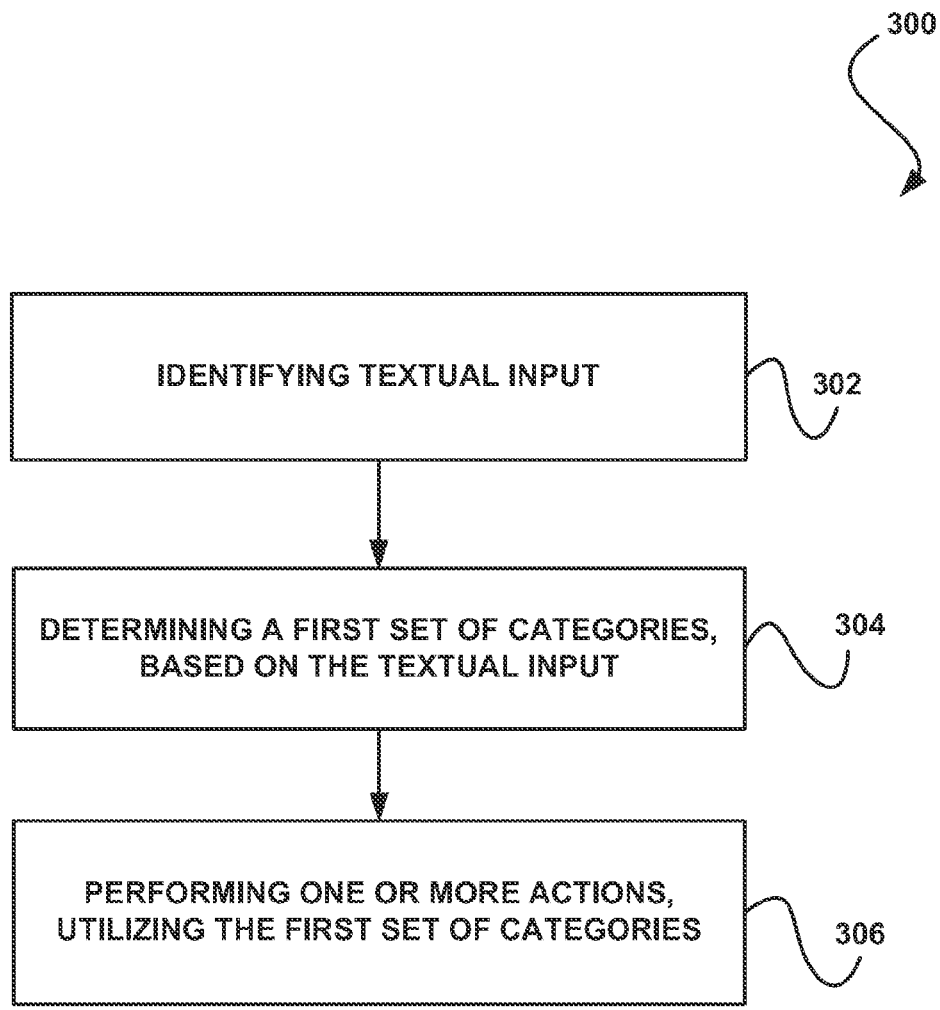
FIG. 3 illustrates a method for determining a set of categories based on textual input, in accordance with one embodiment.

FIG. 3 illustrates a method 300 for determining a set of categories based on textual input, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown in operation 302, textual input is identified. In one embodiment, the textual input may include one or more portions of text (e.g., one or more words, sentences, paragraphs, etc.). In another embodiment, the textual input may be created by a user. For example, the user may create the textual input utilizing a keyboard attached to a computing device. In another example, the user may dictate a message into a microphone, where such dictated message is stored, and where such stored message is converted into the textual input utilizing a text-to-speech application. In yet another embodiment, the textual input may be received by the user. For example, the textual input may include a message (e.g., an electronic mail message, a text message, etc.) sent to the user by another user.

Additionally, in one embodiment, the textual input may be associated with a conversation. For example, the textual input may include notes taken by a user during a conversation. In another example, the textual input may include transcribed portions of the conversation. In another embodiment, the textual input may be associated with a customer service call. For example, the conversation may include a customer service call between a customer and a customer service representative (CSR), and the textual input may include notes taken by the CSR during the customer service call. In yet another embodiment, the textual input may include a customer service request. For example, the textual input may include a request made by a customer utilizing a graphical user interface (GUI). In another example, the textual input may include input made by the customer or CSR utilizing one or more of an email service, a short message service (SMS), a chat service, a social networking service, etc.

Also, in one embodiment, the textual input may include one or more user details. For example, the textual input may include a name of a user (e.g., a customer, etc.), contact information for the user (e.g., a phone number for the user, electronic mail address for the user, mailing address for the user, etc.), questions asked by the user during the conversation, etc. In another embodiment, the textual input may include answers to the user's questions that are provided to the user (e.g., answers provided to the user by the CSR, etc.).

Further, as shown in operation 304, a first set of categories is determined based on the textual input. In one embodiment, the first set of categories may include one or more categories that are determined to be associated with the textual input. For example, the first set of categories may include one or more terms (e.g., words, etc.) that describe one or more types of information found within the textual input. In another embodiment, the first set of categories may include one or more categories under which one or more portions of the textual input may be described, stored, etc.

Further still, in one embodiment, determining the first set of categories may include processing the textual input. For example, processing the textual input may include performing a linguistic categorization analysis utilizing the textual input. In another example, performing the linguistic categorization analysis utilizing the textual input may include applying one or more linguistic rules to one or more portions of the textual input in order to determine one or more categories associated with the textual input. For instance, one or more linguistic rules may be applied against a taxonomy and a linguistic semantic network. In another example, processing the textual input may include extracting one or more concepts from the text. In yet another example, one or more of the concepts may be used when applying one or more of the linguistic rules.

Also, as shown in operation 306, one or more actions are performed, utilizing the first set of categories. In one embodiment, performing the one or more actions may include using the first set of categories to categorize one or more portions of the textual input. For example, one or more portions of the textual input (or one or more records of a conversation from which the textual input was produced) may be stored in one or more sections of a database, where the one or more sections are determined based on the first set of categories. In another embodiment, one or more portions of the textual input may be stored, and each of the one or more portions may be associated with one or more categories within the first set of categories. In this way, a user may retrieve one or more portions of the textual input by performing a search for the one or more categories within the first set of categories.

In addition, in one embodiment, performing the one or more actions may include comparing the determined first set of categories against a second set of categories. For example, the second set of categories may include one or more categories that have been determined to be associated with the textual input. In another embodiment, the second set of categories may be determined by a user. In yet another embodiment, the second set of categories may be associated with a conversation. For example, the second set of categories may be determined based on the conversation. In still another embodiment, the first set of categories and the second set of categories may be associated with the same conversation.

For example, a CSR may participate in a conversation (e.g., a customer service call, etc.) with a customer, where the textual input may include notes taken by the CSR during the customer service call. In another example, the second set of categories may be manually determined by the CSR in response to the conversation. For example, the CSR may manually determine one or more terms (e.g., words, etc.) that describe one or more types of information found within the textual input. In another example, the CSR may determine the second set of set of categories as one or more categories under which one or more portions of the textual input may be stored.

Further, in one embodiment, performing the one or more actions may include determining any differences between the determined first set of categories and the second set of categories. In another embodiment, performing the one or more actions may include generating a report indicating any differences between the determined first set of categories and the second set of categories. In yet another embodiment, performing the one or more actions may include sending the report to one or more users (e.g., the customer, the CSR, a manager of the CSR, etc.). In still another embodiment, performing the one or more actions may include storing the report in a database.

Further still, in one embodiment, performing the one or more actions may include determining whether the differences between the determined first set of categories and the second set of categories are within a predetermined threshold. For example, it may be determined whether a number of differences are within a predetermined number of allowable differences. In another embodiment, performing the one or more actions may include generating a report if the differences between the determined first set of categories and the second set of categories exceed the predetermined threshold.

Also, in one embodiment, performing the one or more actions may include determining whether the differences between the determined first set of categories and the second set of categories include one or more specific differences. For example, it may be determined whether one or more of the differences between the determined first set of categories and the second set of categories include one or more specific predetermined categories. In another embodiment, a report may be generated if the differences between the determined first set of categories and the second set of categories include one or more of the specific differences.

In this way, categorization of the textual input may be efficiently reviewed and refined. Further, one or more actions of users associated with the textual input may be automatically analyzed and managed.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
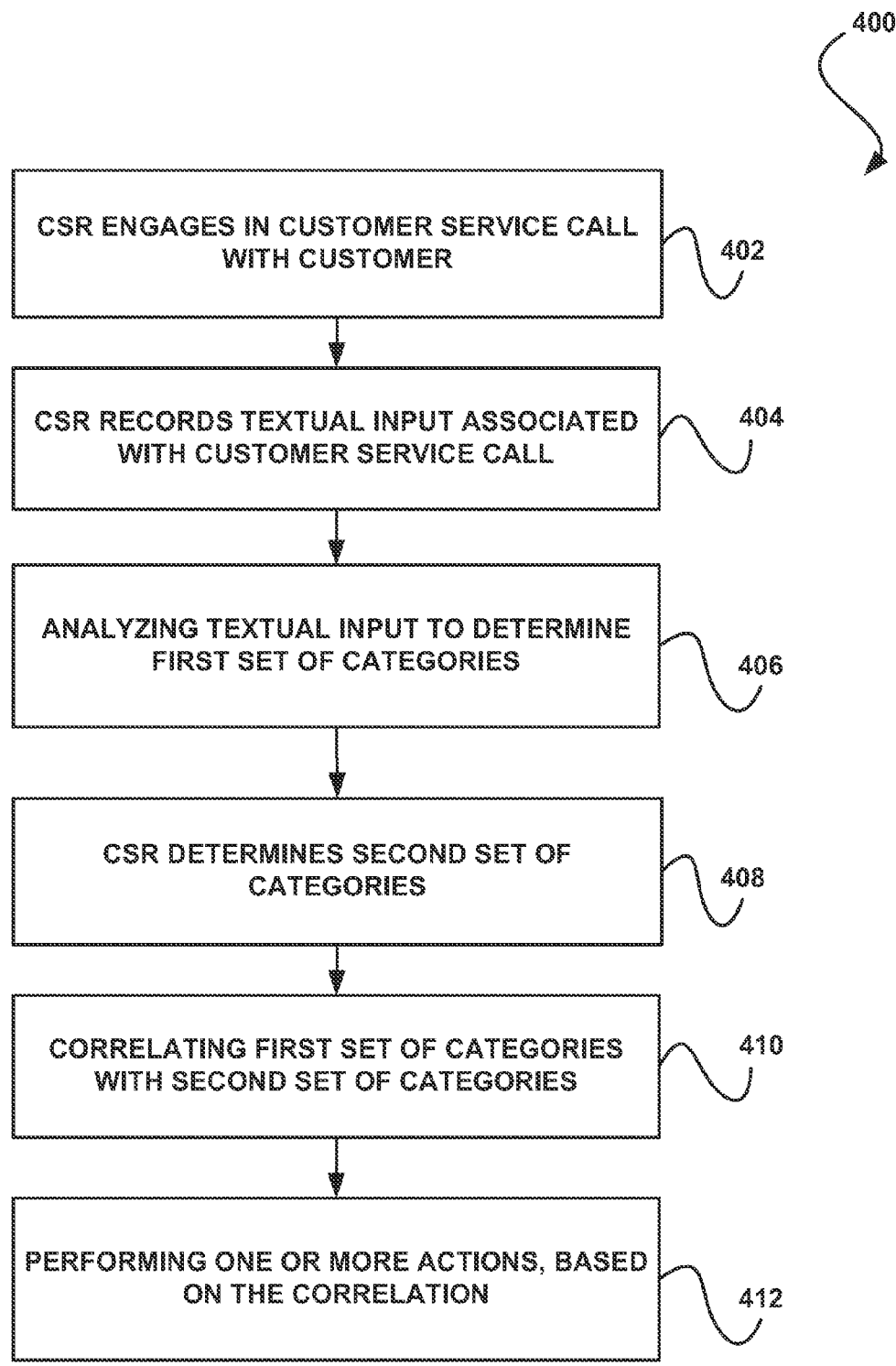
FIG. 4 illustrates a method for performing categorization validation, in accordance with one embodiment.

FIG. 4 illustrates a method 400 for performing categorization validation, in accordance with one embodiment. As an option, the method 400 may be carried out in the context of the details of FIGS. 1-3. Of course, however, the method 400 may be carried out in any desired environment. Further, the aforementioned definitions may equally apply to the description below.

As shown in operation 402, a customer service representative (CSR) engages in a customer service call with a customer. In one embodiment, the customer service call may be initiated by the customer. In another embodiment, the customer service call may be initiated by the CSR. Additionally, as shown in operation 404, the CSR records textual input associated with the customer service call with the customer.

Additionally, in one embodiment, the textual input may include notes associated with the customer service call. For example, the textual input may include the purpose of the call, an identifier of the customer, the customer's contact information, questions asked by the customer, questions answered by the CSR, questions unable to be answered by the CSR, information provided by the CSR, etc. In another embodiment, the CSR may record the textual input during the customer service call. In yet another embodiment, the CSR may record the textual input after the customer service call.

Further, as shown in operation 406, the textual input is analyzed to determine a first set of categories for the textual input. In one embodiment, the textual input may be sent from a local computer to a server and is analyzed at the server. In another embodiment, the textual input may be analyzed at the local computer, utilizing an application installed within the local computer or run remotely from a server utilizing a network.

Further still, in one embodiment, analyzing the textual input utilizing linguistic categorization analysis may include linguistically and semantically determining the first set of categories from the textual input. For example, one or more linguistic rules may be applied to the textual input in order to categorize the textual input. In another embodiment, the categories may include any type of category associated with material found within the textual input. For example, the categories may include a reason for the customer service call, a type of complaint made by the customer, a type of question asked by the customer, a tangible item associated with the customer service call (e.g., a purchased item the customer has a question about, etc.), a location of the customer, a type of the customer (e.g., a subscription customer, a one-time customer, etc.), an indication as to whether a payment was made by the customer during the customer service call, etc.

Also, as shown in operation 408, the customer service representative determines a second set of categories. In one embodiment, the customer service representative may analyze the textual input associated with the customer service call with the customer in order to determine the second set of categories for the textual input. In another embodiment, the customer service representative may determine the second set of categories by manually selecting one or more categories. For example, the customer service representative may select one or more reasons for the customer service call during and/or after the call, utilizing a graphical user interface (GUI).

Additionally, as shown in operation 410, the first set of categories is correlated with the second set of categories. In one embodiment, correlating the first set of categories with the second set of categories may include comparing the first set of categories with the second set of categories in order to determine any differences between the two sets of categories. For example, the second set of categories may be compared to the first set of categories to determine whether the second set of categories determined by the customer service representative matches the first set of categories determined utilizing the linguistic categorization analysis of the textual input provided by the customer service representative.

Further, as shown in operation 412, one or more actions are performed, based on the correlation of the first set of categories with the second set of categories. In one embodiment, performing the one or more actions may include notifying the customer service representative, a supervisor of the customer service representative, the customer, or another entity or individual if one or more differences exist between the first set of categories and the second set of categories. In another embodiment, performing the one or more actions may include notifying an entity or individual a predetermined number of differences exist between the first set of categories and the second set of categories.

In this way, actions of customer service representatives may be more actively and dynamically managed. Additionally, categorization errors made by customer service representatives may be automatically determined and resolved. Further, categories automatically determined utilizing linguistic categorization analysis may be used to automatically format and/or label the textual input provided by the customer service representative.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program embodied on a non-transitory computer readable medium, comprising computer code for:
   identifying textual input, including notes taken by a user during a conversation;
   determining a first plurality of categories describing a plurality of types of information found within the textual input by applying a plurality of linguistic rules to a plurality of portions of the textual input;
   identifying a second plurality of categories determined by the user in response to the conversation;
   determining whether a number of differences between the first set of categories and the second set of categories exceeds a predetermined threshold; and
   generating a report, when it is determined that the number of differences between the first set of categories and the second set of categories exceeds the predetermined threshold.

2. The computer program of claim 1, wherein the conversation includes a customer service call between a customer and a customer service representative (CSR).

3. The computer program of claim 1, wherein the textual input includes a request made by a customer utilizing a graphical user interface (GUI).

4. The computer program of claim 1, further comprising using the first plurality of categories to categorize one or more portions of the textual input.

5. The computer program of claim 1, further comprising determining whether the differences between the determined first plurality of categories and the second plurality of categories include one or more specific differences.

6. A method, comprising:
   identifying textual input, including notes taken by a user during a conversation;
   determining, using a processor, a first plurality of categories describing a plurality of types of information found within the textual input by applying a plurality of linguistic rules to a plurality of portions of the textual input;
   identifying, using the processor, a second plurality of categories determined by the user in response to the conversation;
   determining whether a number of differences between the first set of categories and the second set of categories exceeds a predetermined threshold; and
   generating a report using the processor, when it is determined that the number of differences between the first set of categories and the second set of categories exceeds the predetermined threshold.

7. A system, comprising:
   a processor coupled to a memory, the memory storing program instructions that when executed by the processor perform the following:
   identifying textual input, including notes taken by a user during a conversation;
   determining a first plurality of categories describing a plurality of types of information found within the textual input by applying a plurality of linguistic rules to a plurality of portions of the textual input;
   identifying a second plurality of categories determined by the user in response to the conversation;

determining whether a number of differences between the first set of categories and the second set of categories exceeds a predetermined threshold; and generating a report, when it is determined that the number of differences between the first set of categories and the second set of categories exceeds the predetermined threshold.

8. The system of claim 7, wherein the processor is coupled to the memory via a bus.

* * * * *